United States Patent
Watanabe

(10) Patent No.: US 11,216,266 B2
(45) Date of Patent: Jan. 4, 2022

(54) INFORMATION PROCESSING APPARATUS AND FIRMWARE UPDATING METHOD

(71) Applicant: Genki Watanabe, Tokyo (JP)

(72) Inventor: Genki Watanabe, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 303 days.

(21) Appl. No.: 16/266,344

(22) Filed: Feb. 4, 2019

(65) Prior Publication Data

US 2019/0265963 A1 Aug. 29, 2019

(30) Foreign Application Priority Data

Feb. 27, 2018 (JP) .............................. JP2018-033880

(51) Int. Cl.
*G06F 9/44* (2018.01)
*G06F 8/65* (2018.01)
*G06F 9/4401* (2018.01)

(52) U.S. Cl.
CPC .............. *G06F 8/65* (2013.01); *G06F 9/4401* (2013.01)

(58) Field of Classification Search
CPC ........................................................ G06F 8/65
USPC ........................................................ 717/169
See application file for complete search history.

(56) References Cited

U.S. PATENT DOCUMENTS

| | | | | |
|---|---|---|---|---|
| 6,353,926 B1* | 3/2002 | Parthesarathy | ........... | G06F 8/65 707/999.202 |
| 9,075,689 B2 | 7/2015 | Kanematsu | | |
| 9,235,404 B2* | 1/2016 | Cavalaris | ................ | G06F 8/654 |
| 10,331,428 B1* | 6/2019 | Zalpuri | .................... | G06F 8/654 |
| 2004/0145766 A1 | 7/2004 | Sugishita et al. | | |
| 2011/0131563 A1* | 6/2011 | Ohama | ..................... | G06F 8/65 717/168 |
| 2011/0173603 A1 | 7/2011 | Nakamura et al. | | |
| 2011/0179406 A1* | 7/2011 | Ohama | ............... | G06F 11/1433 717/168 |

(Continued)

FOREIGN PATENT DOCUMENTS

| | | |
|---|---|---|
| JP | 2004-118586 | 4/2004 |
| JP | 2007-295371 | 11/2007 |
| JP | 2008-152793 | 7/2008 |

(Continued)

OTHER PUBLICATIONS

Japanese Office Action for JP2018-033880 dated Nov. 9, 2021.

*Primary Examiner* — Evral E Bodden
(74) *Attorney, Agent, or Firm* — IPUSA, PLLC

(57) ABSTRACT

An information processing apparatus executes one or more pieces of firmware. The information processing apparatus includes a hardware processor configured to refer to update procedure information in which a precondition and an environmental condition are set, the precondition being required for updating the firmware and being set for each piece of the firmware in an updating order of updating the respective pieces of firmware, the environmental condition defining a process for preparing an environment for an updated piece of the firmware; determine whether the precondition is satisfied in the updating order, and update the firmware that is an update target, upon determining that the precondition is satisfied; and execute the process according to the environmental condition, after updating the one or more pieces of the firmware.

11 Claims, 12 Drawing Sheets

(56) References Cited

U.S. PATENT DOCUMENTS

2011/0246682 A1  10/2011  Kamimaru et al.
2018/0267793 A1   9/2018  Watanabe

FOREIGN PATENT DOCUMENTS

| JP | 2010-79438  | 4/2010  |
| JP | 2011-210104 | 10/2011 |
| JP | 5959942     | 8/2016  |

* cited by examiner

FIG.7A

| MODEL NUMBER | SRS1 |
|---|---|
| SYSTEM COMPONENT NUMBER | B1045050 |
| SYSTEM ID | SRSbbF_pk |
| SYSTEM VERSION | 1.00.01 |
| I/F VERSION | 2.0.0.1 |
| RELEASE DATE | 2017/06/28 |

FIG.7B

| No. | PROCESSING | COMPONENT NUMBER | MODULE ID | VERSION | PRECONDITION (HIGHER THAN OR EQUAL TO...) |
|---|---|---|---|---|---|
| 1 | Install | B1040001A | SRSbbF1 | 1.00.01 | |
| 2 | Install | B1042001A | SRSbbF2 | 1.02.00 | |
| 3 | Install | B1043001A | SRSbbF3 | 1.00.10 | SRSbbF2 1.02.00 |
| 4 | Force_Reboot | | | | |
| 5 | Install | B1044001A | SRSbbF4 | 1.01.01 | |
| 6 | Install | B1045001A | SRSbbF5 | 1.00.02 | |
| 7 | Ctrl_Reboot | | | | |

| PRIORITY LEVEL | RELEASE DATE | DOWNLOAD URL |
|---|---|---|
| 2 | 2017/10/10 | /aaa/bbb/ccc/firm/dataA.data |
| 2 | 2017/4/3 | /aaa/bbb/ccc/firm/dataB.data |
| 1 | 2017/5/5 | /aaa/bbb/ccc/firm/dataC.data |
| 2 | 2017/6/9 | /aaa/bbb/ccc/firm/dataD.data |
| 1 | 2017/10/1 | /aaa/bbb/ccc/firm/dataE.data |

INFORMATION PROCESSING APPARATUS AND FIRMWARE UPDATING METHOD

CROSS-REFERENCE TO RELATED APPLICATION

The present application is based on and claims priority under 35 U.S.C. § 119 to Japanese Patent Application No. 2018-033880, filed on Feb. 27, 2018, the contents of which are incorporated herein by reference in their entirety.

BACKGROUND OF THE INVENTION

1. Field of the Invention

The present invention relates to an information processing apparatus and a firmware updating method.

2. Description of the Related Art

In an information processing apparatus, a program generally referred to as firmware operates. Firmware is a type of software that controls hardware elements that are largely related to basic functions of the information processing apparatus. Firmware is fixedly incorporated in a Read-Only Memory (ROM), and is often handled distinctly from programs that are not necessarily related to the control of hardware and that are stored in a Hard Disk Drive (HDD).

There are some information processing apparatuses that can acquire the latest firmware by communicating with a server and automatically update the firmware.

However, in updating the firmware, it is necessary to satisfy a precondition relating to the version of the firmware, and there are cases where the firmware cannot be updated even when the latest firmware is acquired by the electronic device. The precondition means, for example, "the firmware cannot be updated to the latest firmware unless the version of certain firmware is higher than or equal to a particular version."

In order to address such inconveniences, a technique for updating pieces of firmware in an order so as to satisfy the precondition, has been devised (see, for example, Patent Document 1). Patent Document 1 discloses a management apparatus that acquires firmware for a main device, firmware for an accessory device, and a file indicating procedures for updating the firmware, and performs a process of updating the firmware of the main device and the firmware of the accessory device by the procedures according to the device configuration of the main device, based on the acquired file.

Patent Document 1: Japanese Unexamined Patent Application Publication No. 2004-118586

SUMMARY OF THE INVENTION

An aspect of the present invention provides an information processing apparatus and a firmware updating method, in which one or more of the disadvantages of the related art are reduced.

According to one aspect of the present invention, there is provided an information processing apparatus for executing one or more pieces of firmware, the information processing apparatus including a hardware processor configured to refer to update procedure information in which a precondition and an environmental condition are set, the precondition being required for updating the firmware and being set for each piece of the firmware in an updating order of updating the respective pieces of firmware, the environmental condition defining a process for preparing an environment for an updated piece of the firmware; determine whether the precondition is satisfied in the updating order, and update the firmware that is an update target, upon determining that the precondition is satisfied; and execute the process according to the environmental condition, after updating the one or more pieces of the firmware.

BRIEF DESCRIPTION OF THE DRAWINGS

FIGS. 7A and 7B are examples of diagrams illustrating more detailed contents of update instruction description data according to an embodiment of the present invention;

DETAILED DESCRIPTION OF THE PREFERRED EMBODIMENTS

With the technology of the related art, there is a problem that no considerations are made to prepare an environment in which new firmware can operate normally. For example, depending on the firmware, the information processing apparatus may not be able to execute the updating of firmware, unless the information processing apparatus has been booted with a version of the firmware that is higher than or equal to a particular version. Thus, simply by considering the updating procedure of the firmware, it is difficult to prepare an environment in which the firmware can operate normally.

A problem to be solved by an embodiment of the present invention is to provide an information processing apparatus capable of preparing an environment in which new firmware can operate normally.

Hereinafter, an image forming apparatus 10 and a firmware updating method performed by the image forming apparatus 10 will be described as an example of an embodiment for carrying out the present invention, with reference to the drawings.

<Outline of Updating Firmware>

Figure 1:
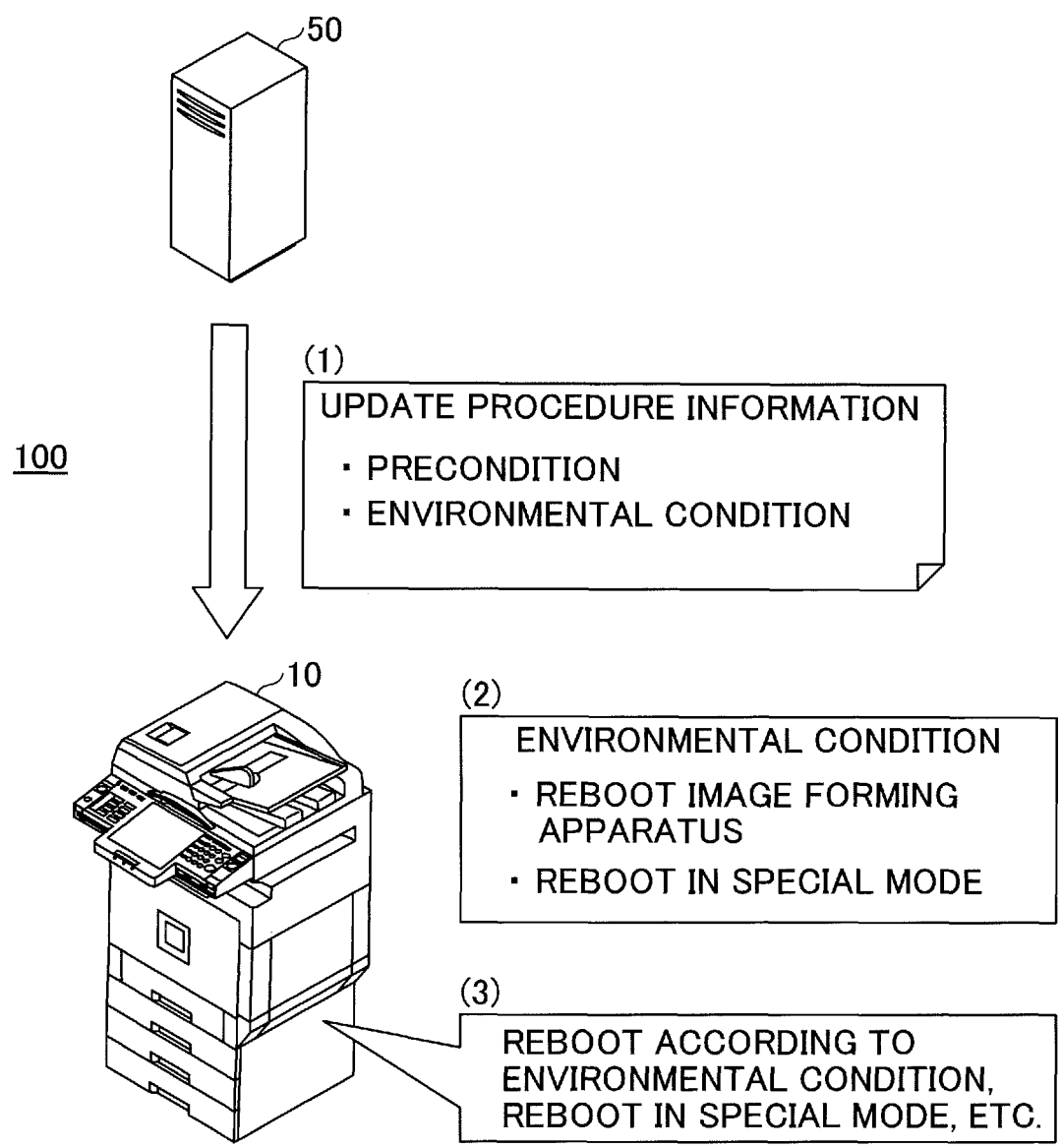
FIG. 1 is a diagram illustrating an outline of updating firmware performed by an image forming apparatus according to an embodiment of the present invention.

FIG. 1 is a diagram for describing an outline of updating firmware performed by the image forming apparatus 10 according to the present embodiment. The image forming apparatus 10 according to the present embodiment updates the firmware based on update procedure information including an environmental condition as well as the precondition. The precondition is a condition relating to the consistency of the version of the firmware, such as firmware cannot be updated to the latest firmware unless the version of certain firmware is higher than or equal to a particular version.

(1) First, the image forming apparatus 10 acquires update procedure information including a precondition and an environmental condition, from a server apparatus 50. The image forming apparatus 10 updates one or more pieces of firmware according to the precondition. Updating corresponds to installing, and means storing in a nonvolatile storage device.

(2) In the environmental condition, a process performed by the image forming apparatus 10 for updating the firmware is described, such as "reboot image forming apparatus" and "reboot in special mode".

(3) The image forming apparatus 10 is rebooted or rebooted in a special mode, according to the environmental condition.

By following the environmental condition as described above, it is possible to prepare an environment in which the updated firmware can operate normally. For example, the firmware (FW) updated by rebooting is loaded in the random-access memory (RAM), so as to satisfy the precondition for the firmware to be updated next. That is, it will be possible to update another firmware by rebooting. Furthermore, it will be possible to update firmware that can be updated only in a special booting mode.

<Terms>

Firmware is a type of software that controls hardware elements that are largely related to basic functions of the information processing apparatus. Firmware may be referred to as customary terms of an information processing apparatus, such as a microcode or a device driver, etc. The information processing apparatus according to the claims may be any apparatus as long as the firmware can be updated. In the present embodiment, an image forming apparatus will be described as an example.

The order of updating the firmware is the preferable updating order when a plurality of pieces of firmware is updated. The updating order may not be absolute; the next firmware may be updated upon skipping the order.

The process for preparing an environment for the updated firmware corresponds to a process that enables the execution the firmware, and a process that enables updating another firmware, etc. In the present embodiment, as one example, this process corresponds to rebooting.

<System Configuration Example>

Figure 2:
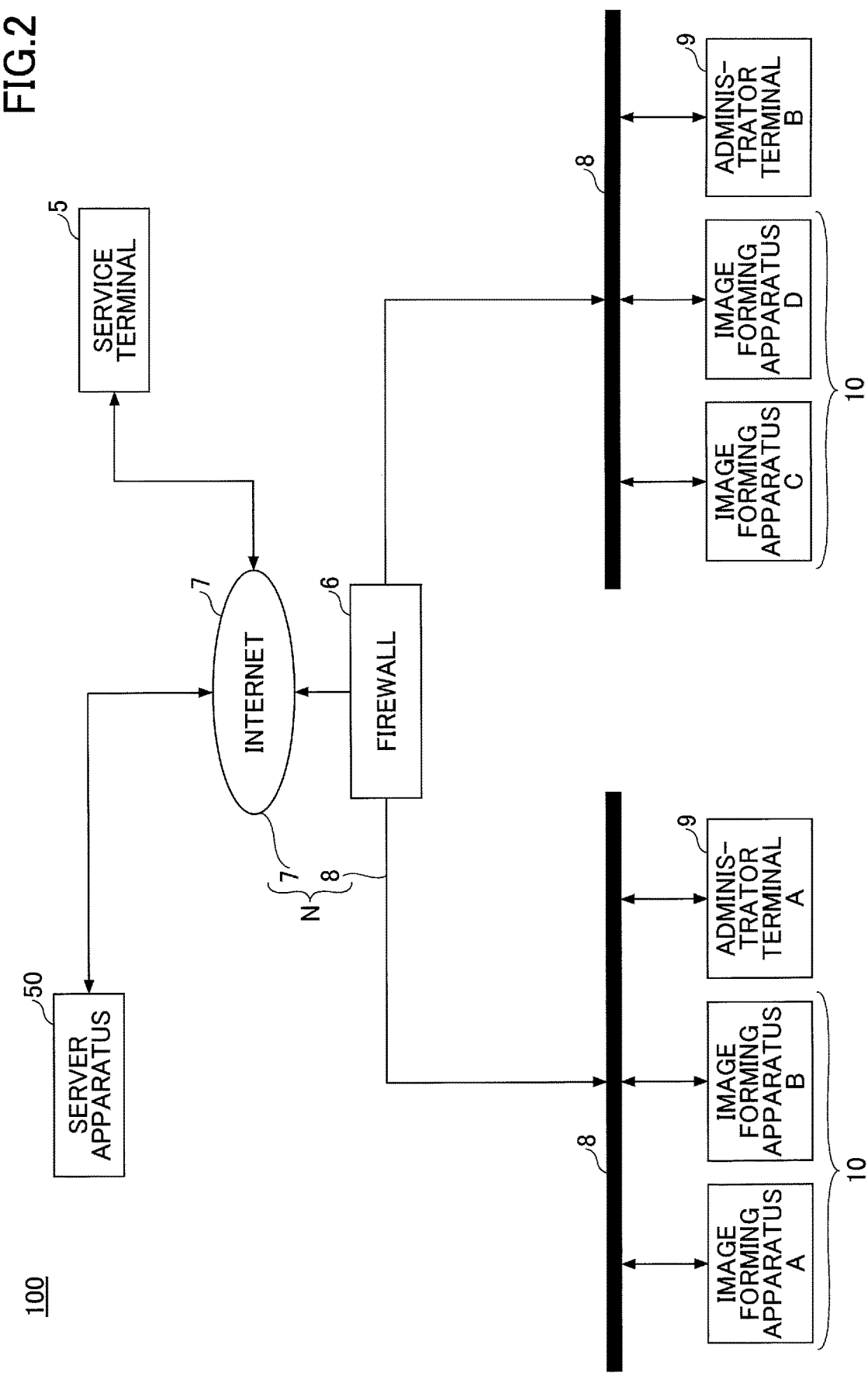
FIG. 2 is an example of a diagram illustrating a configuration example of a firmware update system according to an embodiment of the present invention.

FIG. 2 illustrates a configuration example of a firmware update system 100. The firmware update system 100 includes the server apparatus 50, an administrator terminal 9, a service terminal 5, and one or more image forming apparatuses 10 that can communicate via a network N.

The network N includes the Internet 7 outside a firewall 6 and a Local Area Network (LAN) 8 inside the firewall 6. In FIG. 2, the server apparatus 50 and the service terminal 5 are connected to the Internet 7; however, the server apparatus 50 and the service terminal 5 may be connected to the LAN 8. Further, although the LAN 8 may be constructed by either a wired or wireless network, in the case of the image forming apparatus 10 communicating in a mobile phone network, it is possible to connect to the Internet 7 without involving the LAN.

Furthermore, the image forming apparatus 10 need not be connected to the network N. The update procedure information may be distributed to the image forming apparatus 10 in a state of being stored in a portable storage medium. In this case, the image forming apparatus 10 need not communicate with the server apparatus 50.

Although the image forming apparatuses 10A to 10D are connected to the LAN 8, it is sufficient that only one image forming apparatus 10 is provided. Furthermore, the administrator terminals 9A and 9B are also connected to the LAN 8. The administrator terminals 9A and 9B are terminals used by an administrator managing the image forming apparatus 10. The administrator manually upgrades the firmware or operates the administrator terminals 9A and 9B to update the settings of the image forming apparatus 10.

Furthermore, the server apparatus 50 is one or more information processing apparatuses that provide firmware and update procedure information to the image forming apparatus 10. Each image forming apparatus 10 queries the server apparatus 50 about the presence or absence of new firmware, for example, at the time of booting, at a fixed time once a day, at the time of shifting to energy saving, at the time of returning from energy saving, or according to an operation by an administrator. When there is new firmware, the server apparatus 50 provides firmware and update procedure information to the image forming apparatus 10.

The service terminal 5 is a terminal operated by a service staff who manages the updating of the firmware. The service staff transmits the new firmware and the updating procedure information of the firmware from the service terminal 5 to the server apparatus 50. In this manner, new firmware and update procedure information are registered in the server apparatus 50. Furthermore, the service staff can make general settings on the server such as a password for root authorization, a user authentication method, and server software update, etc.

<Example of Hardware Configuration>

<<Image Forming Apparatus>>

Figure 3:
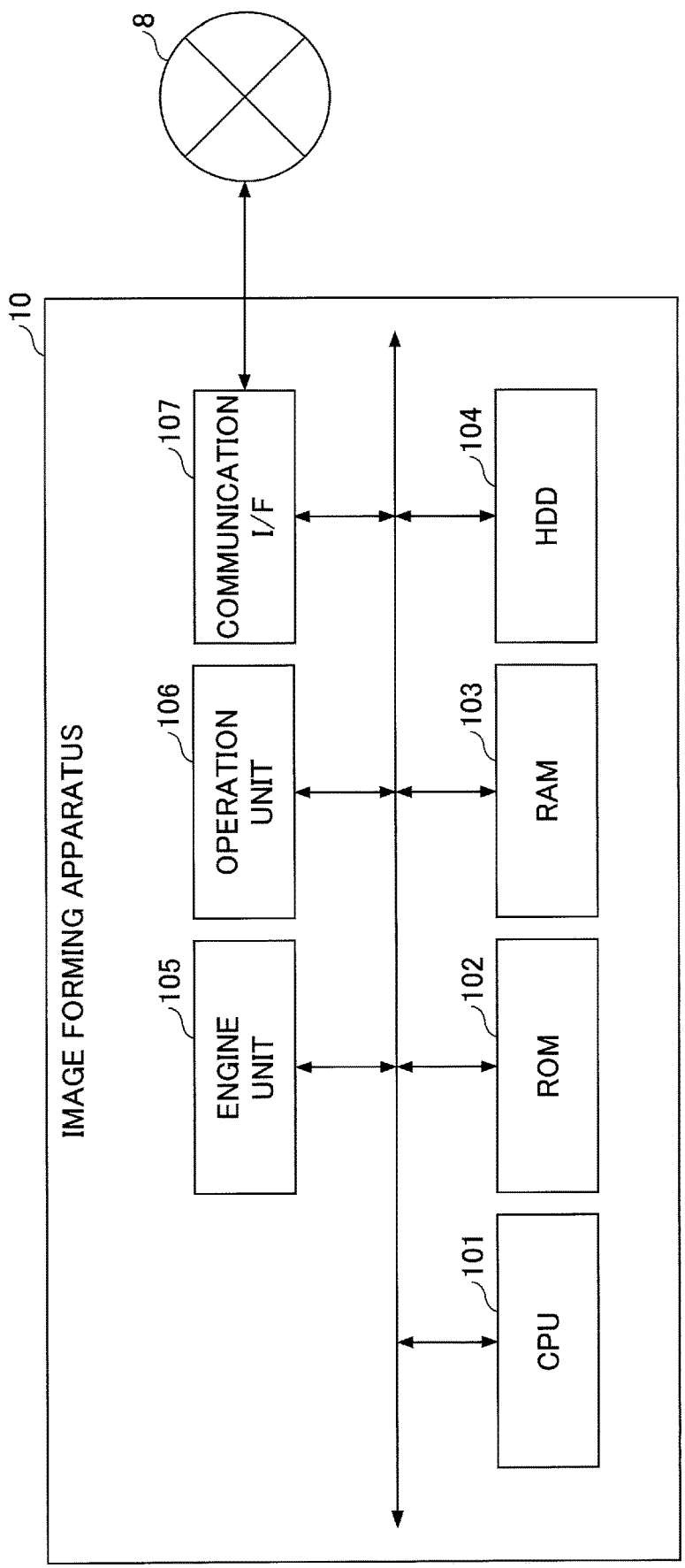
FIG. 3 is an example of a hardware configuration diagram of the image forming apparatus according to an embodiment of the present invention.

FIG. 3 illustrates an example of a hardware configuration diagram of the image forming apparatus 10. The image forming apparatus 10 includes a central processing unit (CPU) 101, a read-only memory (ROM) 102, a random access memory (RAM) 103, a hard disk drive (HDD) 104, an engine unit 105, an operation unit 106, and a communication interface (I/F) 107.

The CPU 101 controls the hardware elements illustrated in FIG. 3 to implement functions such as image formation. The CPU 101 executes a program loaded in the RAM 103 from the ROM 102 or the HDD 104, thereby controlling the overall operations of the image forming apparatus 10. For example, firmware is stored in the ROM 102, and various programs such as an operating system (OS), firmware, and applications corresponding to the functions of the image forming apparatus 10 are stored in the HDD 104. Furthermore, font data and print data are also stored in the HDD 104.

The engine unit 105 includes a hardware driving unit for providing, for example, a copy function, a scanner function, a facsimile function, and a printer function, etc., and an information processing function related thereto. For example, the engine unit 105 includes a scanner (image reading unit) that scans and reads an image of a document, a plotter (image forming unit) that performs printing on a sheet material such as paper, and a fax unit that performs fax communication, etc. Furthermore, it is possible to provide particular options such as a finisher for sorting printed sheet materials and an automatic document feeder (ADF) for automatically feeding original documents.

The communication I/F 107 is an interface for connecting to the LAN 8, and is, for example, a Network Interface Card (NIC) such as an Ethernet card (registered trademark). The operation unit 106 is a display device that displays information and is an input device that accepts operations from a user.

Accordingly, the operation unit 106 is a user interface. The operation unit 106 preferably has a touch panel and accepts pressing of soft keys (buttons), etc., displayed on the operation unit 106. Furthermore, the operation unit 106 may include hard keys.

<<Server Apparatus>>

Figure 4:
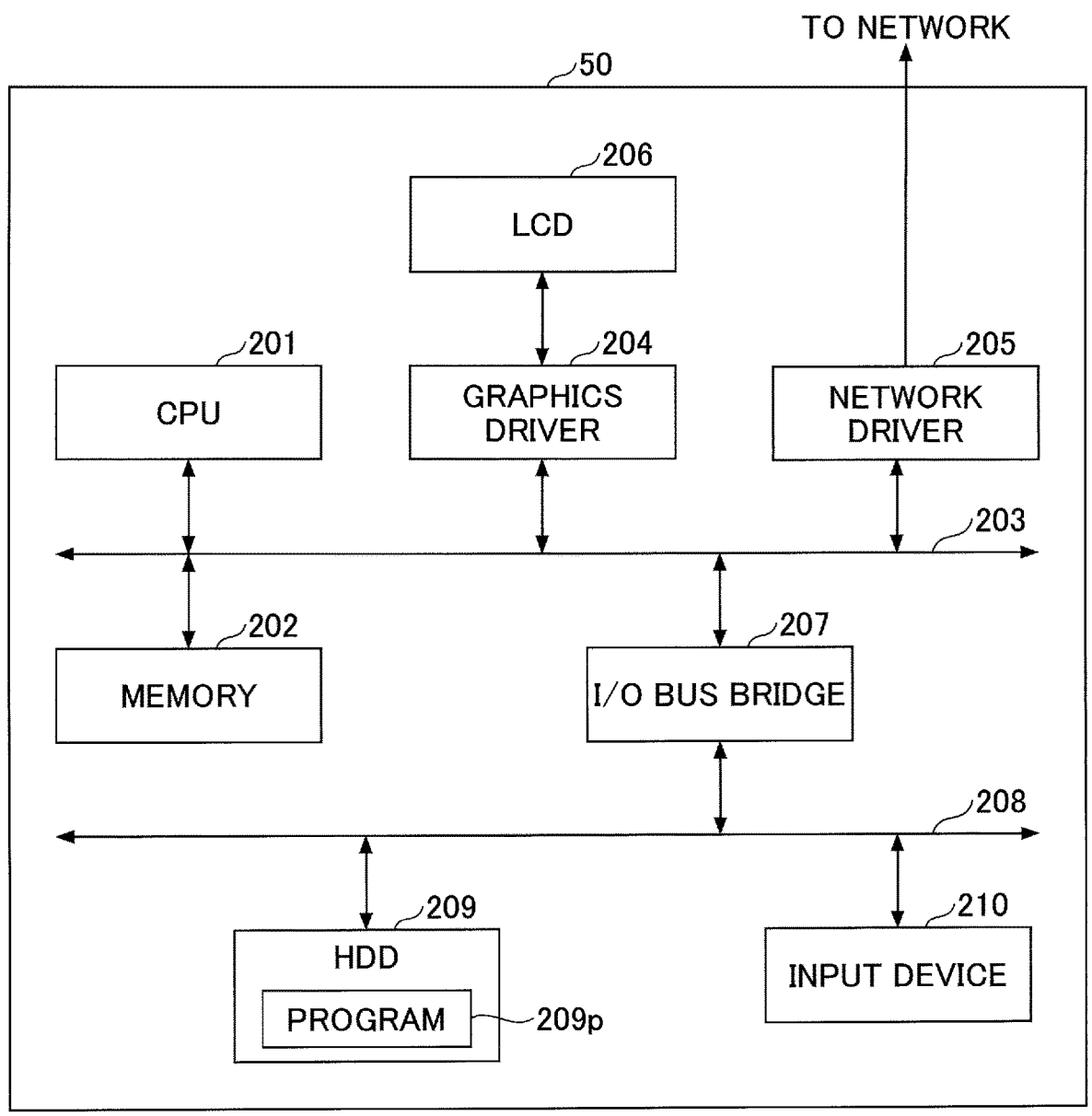
FIG. 4 is an example of a schematic hardware configuration diagram of a server apparatus according to an embodiment of the present invention.

FIG. 4 is an example of a schematic hardware configuration diagram of the server apparatus 50. The server apparatus 50 includes a CPU 201 and a memory 202 that enables high-speed access of data used by the CPU 201. The CPU 201 and the memory 202 are connected to other hardware elements of the server apparatus 50, for example, a graphics driver 204 and a network driver (NIC) 205, via a system bus 203.

The graphics driver 204 is connected to a liquid crystal display (LCD) 206 via a bus, and monitors the processing results of the CPU 201. Furthermore, the network driver 205 connects the server apparatus 50 to the Internet 7 at the transport layer level and the physical layer level to establish a session at the data link layer level.

An input/output bus (I/O bus) bridge 207 is further connected to the system bus 203. On the downstream side of the I/O bus bridge 207, a storage device such as a HDD 209, etc., is connected by Integrated Drive Electronics (IDE), Advanced Technology Attachment (ATA), AT Attachment Packet Interface (ATAPI), serial ATA, Small Computer System Interface (SCSI), and Universal Serial Bus (USB), etc., via an I/O bus 208 such as a Peripheral Component Interconnect (PCI). The HDD 209 stores a program 209p for controlling the entire server apparatus 50. The HDD 209 may be a Solid State Drive (SSD).

Furthermore, an input device 210 such as a keyboard and a mouse (referred to as a pointing device) is connected to the I/O bus 208 via a bus such as a USB, and input and instructions by an operator such as a system administrator are accepted.

It is preferable that the server apparatus 50 is compatible with cloud computing. Cloud computing is a mode of usage in which resources on the network are used without being conscious of particular hardware resources. In this case, the illustrated hardware configuration of the server apparatus 50 does not need to be housed in a single casing or provided as a unitary device, and the illustrated hardware configuration indicates hardware elements that are preferably included in the server apparatus 50.

<Example of Software Configuration>

Figure 5:
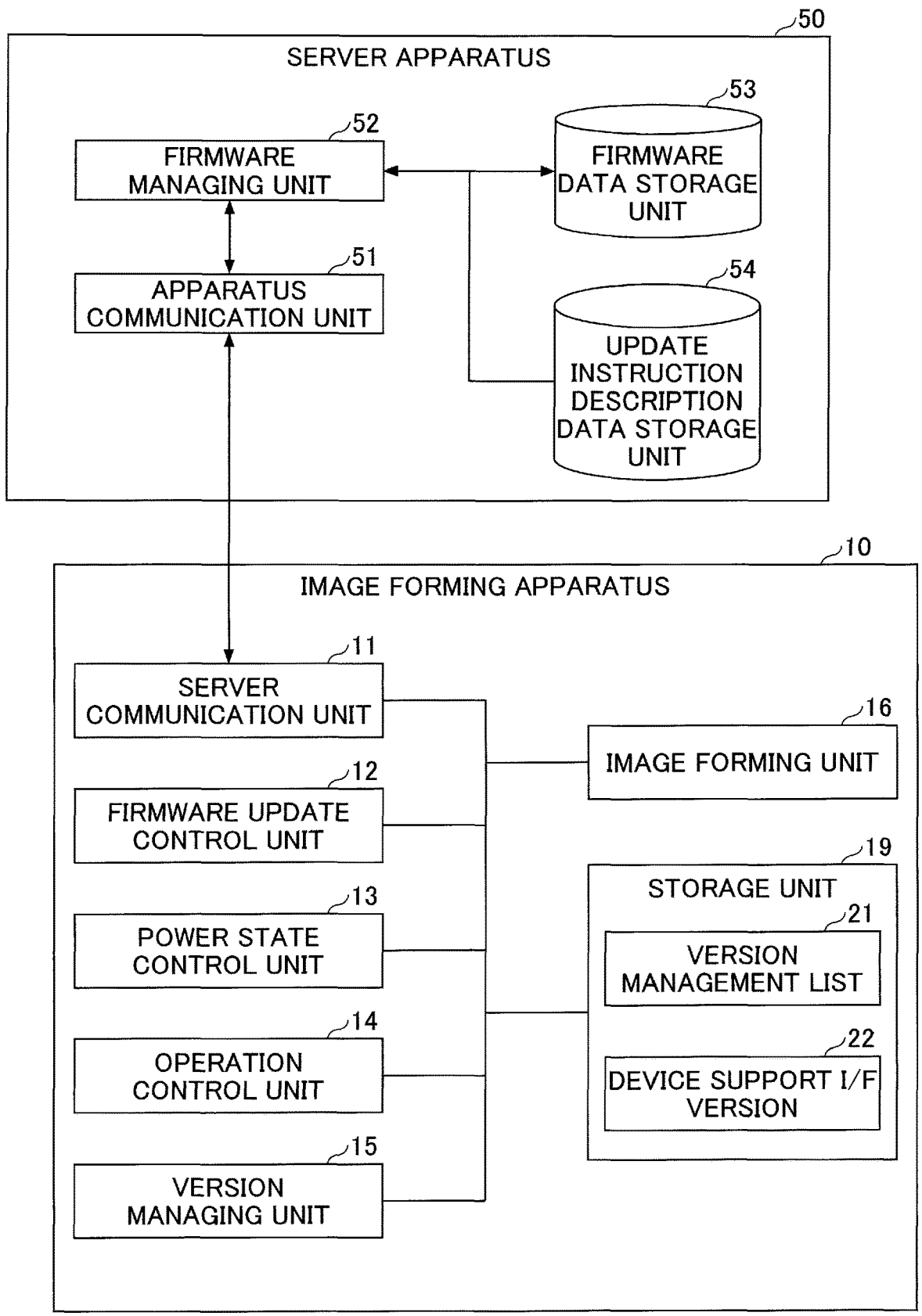
FIG. 5 is an example of a functional block diagram illustrating functions of the image forming apparatus and the server apparatus in a block form according to an embodiment of the present invention.

Next, with reference to FIG. 5, a software configuration of the image forming apparatus 10 and the server apparatus 50 will be described. FIG. 5 is an example of a functional block diagram illustrating functions of the image forming apparatus 10 and the server apparatus 50 in a block form.

<<Image Forming Apparatus>>

The image forming apparatus 10 includes a server communication unit 11, a firmware update control unit 12, a power state control unit 13, an operation control unit 14, a version managing unit 15, and an image forming unit 16. The functions of the image forming apparatus 10 are functions or means implemented by any one of the constituent elements illustrated in FIG. 3 being operated by a command from the CPU 101 according to a program (excluding firmware) loaded in the RAM 103 from the HDD 104. Note that the program is distributed from a server for program distribution or distributed by being stored in a storage medium.

Furthermore, the image forming apparatus 10 includes a storage unit 19. The storage unit 19 is a storage means formed in at least one of the ROM 102, the RAM 103, and the HDD 104 illustrated in FIG. 3.

The firmware update control unit 12 performs overall processing relating to updating of the firmware. When updating the firmware, the firmware update control unit 12 controls the image forming apparatus 10 according to the precondition and the environmental condition for updating. For example, the firmware update control unit 12 checks the version of firmware 2 necessary for updating firmware 1 according to a precondition, and installs the firmware 2 first.

Furthermore, for example, after updating the firmware 1 of the image forming apparatus 10, the entire image forming apparatus is rebooted and then the pieces of firmware 2 and 3 are updated. Alternatively, after updating the firmware 1, the updating of the firmware 2 is skipped, and the firmware 3 is updated, and then the entire image forming apparatus is rebooted, and then the firmware 3 is updated, and the image forming apparatus 10 is reconnected with components used by the firmware 2.

The version managing unit 15 manages each version of the firmware, a representative version representing versions of each firmware, a version of an I/F that can support the entire image forming apparatus 10, etc. The version of the I/F that can support the entire image forming apparatus 10 is described in Table 2.

Information managed by the version managing unit 15 is stored in the storage unit 19. Table 1 indicates an example of a version management list 21 stored in the storage unit 19. When the image forming apparatus 10 is booted, the versions of the respective pieces of firmware are collected from the respective pieces of firmware by the version managing unit 15.

TABLE 1

(a)

| | |
|---|---|
| SYSTEM COMPONENT NUMBER | B1045049 |
| SYSTEM ID | SRSbbF_pj |
| SYSTEM VERSION | 1.00.00 |
| I/F VERSION | 2.0.0.1 |
| RELEASE DATE | 2017/02/21 |

(b)

| MODULE NAME | VERSION | EXTERNAL I/F VERSION | RELEASE DATE |
|---|---|---|---|
| FIRMWARE A1a | 1.2 | 6.0 | 2017/03/04 |
| FIRMWARE A2a | 2.2 | 1.3 | 2016/08/21 |
| FIRMWARE A3a | 1.5 | 4.2 | 2017/05/10 |
| ... | ... | ... | ... |

The version management list 21 includes firmware overall information indicated in Table 1 (a) and version information indicated in Table 1 (b). The firmware overall information is overall information of a set of pieces of firmware operating in the image forming apparatus 10 (such information may be referred to as bibliographic information in some cases). The firmware overall information may be statically stored in the storage unit 19 or may be held in predetermined firmware and may be acquired from the predetermined firmware by the version managing unit 15. The firmware overall information will be described with reference to FIG. 7.

In the version information, versions, external I/F versions, release dates, etc., are registered in association with the firmware (module name). The version indicates the number of revisions of each firmware. The external I/F version is the version of Web API for invoking the firmware by an external program. For example, an external I/F is used when an external program acquires the version of the firmware by File Transfer Program (FTP). The user can cause the administrator terminal 9 to communicate with the image forming apparatus 10 and obtain various kinds of information via the external I/F. In a case where the image forming apparatuses 10 having different generations is used in the user environment, the administrator can acquire the external I/F version at the administrator terminal 9 and determine the supported processing for each image forming apparatus 10.

Each firmware can be updated independently, and, therefore, as indicated in Table 1, there may be cases where the version of the external I/F of the firmware A1a is 6.0, but the version of the external I/F of the firmware A2a is 1.3. The external I/F version is managed separately from the firmware version, because the firmware version and the external I/F version do not match (even if the version of the firmware is upgraded, the version of the external I/F does not change, or vice versa).

TABLE 2

| DEVICE SUPPORT I/F VERSION | 1.3 |
|---|---|

Table 2 indicates an example of a device support I/F version 22 stored in the storage unit 19. The device support I/F version 22 is a version of the I/F that can support the entire image forming apparatus 10. In the present embodiment, the device support I/F version 22 is the lowest version among the external I/F versions of each firmware. For example, in the example of Table 1, the version 1.3 is the lowest version of the entire image forming apparatus 10, and, therefore, the device support I/F version 22 is 1.3.

Referring back to FIG. 5, upon receiving a return request from the operation unit 106 in the energy saving state, the power state control unit 13 causes the image forming apparatus 10 to return to a standby state (regular state). There are various returning factors such as panel touching, a timer, and external access via the network, etc. Furthermore, the power state control unit 13 causes the image forming apparatus 10 or a part thereof to shift to the energy saving state from the standby state according to a non-operation time. The power state control unit 13 manages the power of various devices according to requests to shift to the energy saving state or to return from the energy saving state.

The operation control unit 14 controls the power state, etc., in the operation unit. Therefore, the operation control unit 14 can reboot the operation unit 106.

The image forming unit 16 is implemented by driving the engine unit 105 illustrated in FIG. 3, and executes various image forming functions (for example, printing, copying, scanning, facsimile transmission, etc.) provided in the image forming apparatus 10. The image forming unit 16 can reboot the engine unit 105.

The server communication unit 11 transmits and receives various kinds of information to and from the server apparatus 50. In the present embodiment, the server communication unit 11 queries the server apparatus 50 for information related to new firmware, and acquires firmware and update instruction information from the server apparatus 50.

<<Server Apparatus>>

The server apparatus 50 includes an apparatus communication unit 51 and a firmware managing unit 52. These functions of the server apparatus 50 are functions or means implemented by any one of the constituent elements illustrated in FIG. 4 being operated by a command from the CPU 201 according to a program loaded in the memory 202 from the HDD 209. Note that this program is distributed from a server for program distribution or distributed by being stored in a storage medium.

Figure 6A:
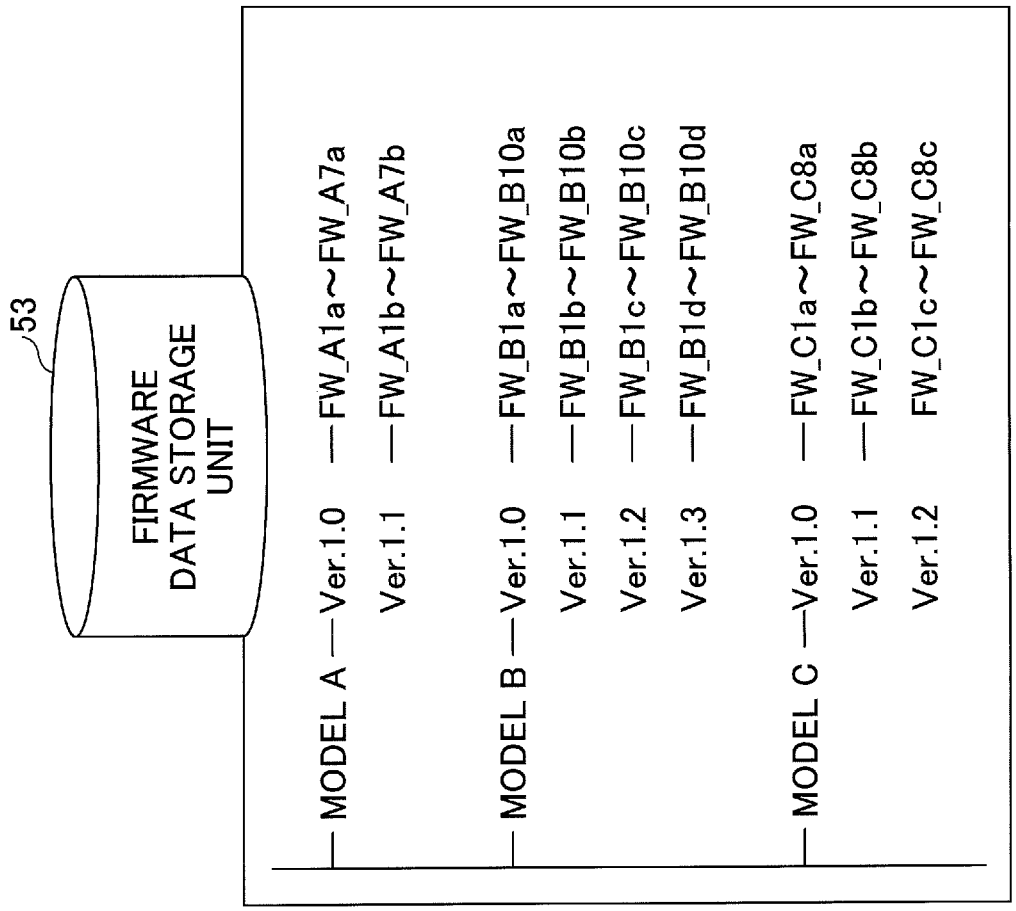
FIGS. 6A and 6B are diagrams illustrating an example of firmware data stored in a firmware data storage unit and an example of update instruction description data stored in an update instruction description data storage unit according to an embodiment of the present invention.
Figure 6B:
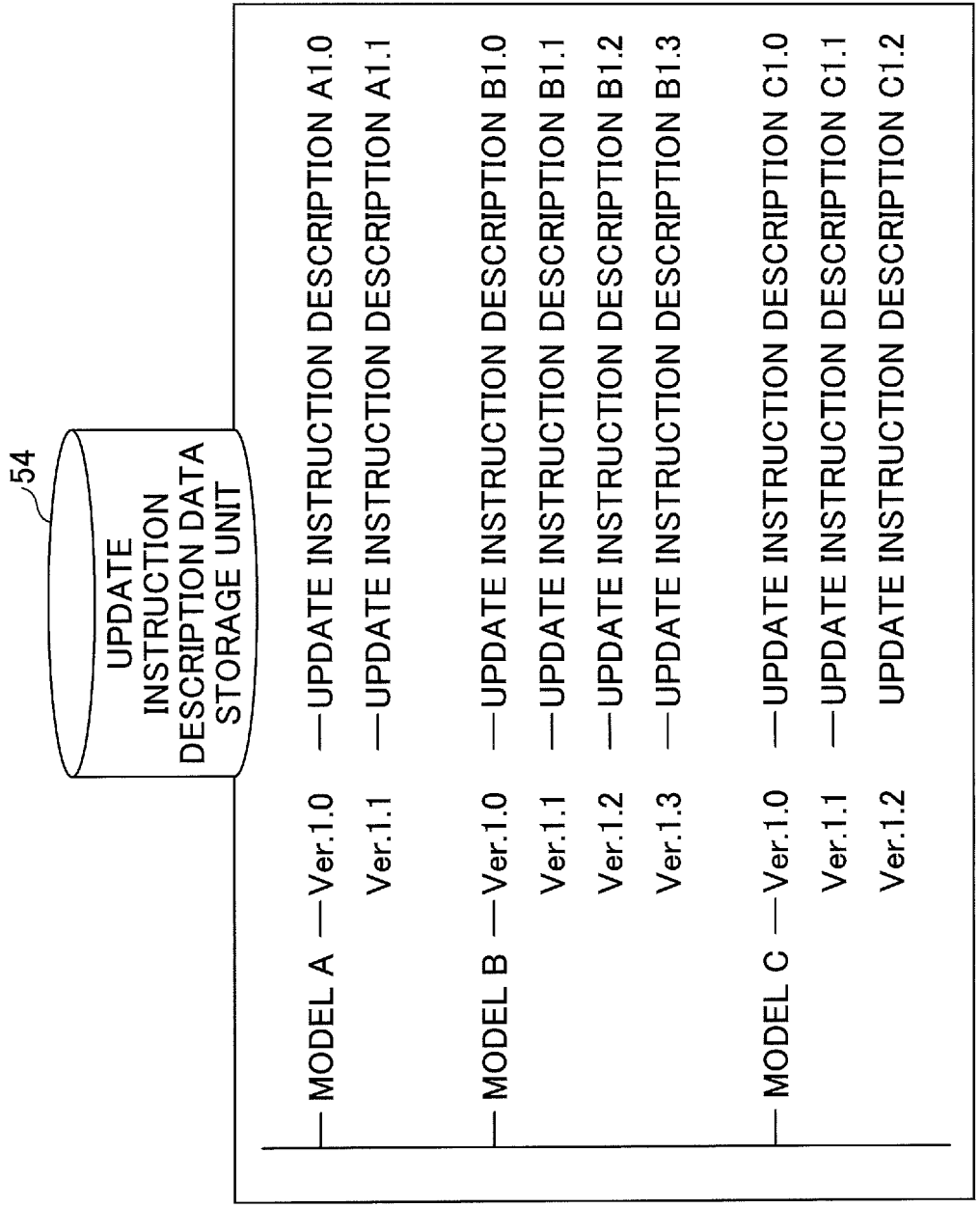

Furthermore, the server apparatus 50 includes a firmware data storage unit 53 and an update instruction description data storage unit 54. These are storage means formed in at least one of the memory 202 and the HDD 209 illustrated in FIG. 4. FIGS. 6A and 6B illustrate information stored in the firmware data storage unit 53 and the update instruction description data storage unit 54.

The apparatus communication unit 51 transmits and receives various kinds of information to and from the image forming apparatus 10. In the present embodiment, the apparatus communication unit 51 receives a query about information related to new firmware from the image forming apparatus 10, and transmits firmware and update instruction information to the image forming apparatus 10.

The firmware managing unit 52 manages the firmware stored in the firmware data storage unit 53 and the update instruction description data stored in the update instruction description data storage unit 54, and reads these pieces of information in response to a request from the image forming apparatus 10.

<Firmware Data Storage Unit and Update Instruction Description Data Storage Unit>

FIGS. 6A and 6B illustrate an example of the firmware data stored in the firmware data storage unit 53 and an example of the update instruction description data stored in the update instruction description data storage unit 54. As illustrated in FIG. 6A, the firmware data is firmware of each version prepared for each model.

Model A-Ver1.0-FW_A1a~FW_A7a

The above description indicates that there are FW_A1a to FW_A7a as the pieces of firmware for which the representative version of model A is 1.0. Note that each of FW_A1a to FW_A7a may be referred to as a module, based on the meaning as a component of firmware of one model. Furthermore, as illustrated in FIG. 6B, update instruction description data is prepared for each model and representative version.

FIGS. 7A and 7B are diagrams illustrating more detailed contents of the update instruction description data as an example. The update instruction description data includes firmware overall information (FIG. 7A) and update procedure information (FIG. 7B). The firmware overall information includes the items of a model number, a system part number, a system identification data (ID), a system version, an I/F version, and a release date.

The model number is information for identifying or specifying the model of the image forming apparatus 10. That is, the model number indicates that the firmware is directed to this model. The system component number is a component number of a system implemented by this firmware. The system ID is identification information of the system. The system version is the version of the entire system, and corresponds to the representative version. The I/F version is the device support I/F version 22 described with reference to Table 2. The release date is the release date of a series of firmware identified by this system version.

Furthermore, the update procedure information includes at least a precondition and an environmental condition. In FIG. 7B, the firmware installation procedure of the firmware (processing, component number, module ID, version, precondition, priority level, release date, and download Uniform Resource Locator (URL)) is described in order in association with the number (No.). No. (number) indicates the order of processes necessary for updating the firmware. The firmware update control unit 12 performs processing in the order of No. (number).

"Processing" is the implementation content performed by the image forming apparatus 10. For example, there are "Install", "Reboot", "Panel Reboot", "Force Reboot", and "Ctrl Reboot", etc. Among these implementation contents, "Reboot", "Panel Reboot", "Force Reboot", and "Ctrl Reboot" are environmental conditions. Note that "Install" means updating. For example, "Force Reboot" of No. 4 is performed in order to enable normal execution of at least one of the pieces of firmware among No. 1 to No. 3, and to enable the updating of the firmware from and beyond No. 5 (to satisfy the precondition).

Furthermore, preconditions may be set for "Reboot", "Panel Reboot", "Force Reboot", and "Ctrl Reboot". In this case, in order to execute rebooting, it is required that the firmware set under the precondition is of a version that is higher than or equal to a predetermined version. Therefore, the updating of the firmware set under the precondition of rebooting, can be set as the condition of rebooting. For example, firmware that needs to be rebooted once for data initialization is the target.

Furthermore, as "processing", "special booting next time", and "connect with new component", etc., may be set.

"Component No." is the component number of the firmware, and "Module ID" is the identification information of the firmware. "Version" is the version of each firmware. "Precondition" describes the version of other firmware, etc., necessary for updating the firmware. In the example of FIG. 7B, it is set that the version of SRSBBF2 must be 1.02.00 or higher in order to install the firmware of SRSBBF3. The precondition may specify the version of firmware to be updated. Note that as information for determining whether the firmware is new or old, the release date and time, or the suffix of the component number (last several digits), etc., may be used, in addition to the version.

"Priority level" indicates the behavior when the precondition is not satisfied. For example, firmware having a high priority level (the priority level is higher than or equal to a threshold value) is processed so as to be updated as much as possible even after rebooting. Specifically, installing of the firmware is retried several times after rebooting, and the rebooting and the installing of the firmware are retried several times. With respect to firmware having normal or low priority level (the priority level is less than a threshold value), the firmware is updated at the next update timing. That is, the installing is not retried.

The number of times of retrying to install the firmware may also depend on the priority level. The higher the priority level becomes, the larger the number of retries is set when the update (installation) fails. The lower the priority level becomes, the smaller the number of times retries is set, or the number of times of retries is set to zero, when the update (installation) fails.

The firmware update control unit 12 stores the number of retries corresponding to the priority level in the storage unit 19 in association with firmware, before the rebooting. After rebooting, the updating is tried with reference to the number of retries in the storage unit 19. Every time the updating fails, the number of retries is decreased one by one, and the rebooting is performed again. By limiting the number of times of rebooting and retrying when the precondition is not satisfied in one firmware updating operation, it is possible to prevent an increase in the updating time.

"Release date" is the date on which each firmware (module) has been released. "Download URL" indicates the URL where each firmware (module) is stored.

Basically, the firmware update control unit 12 updates the firmware in the order of numbers in the update instruction description order (when the processing is installing); however, when there is firmware for which the priority level is urgent (the priority level is higher than "High"), and there is low-priority firmware for which the priority level is low and the number is before the urgent firmware but the low-priority firmware does not satisfy the precondition, the updating of the low-priority firmware is skipped and the process may proceed to the updating of the high-priority firmware. By doing so, when there is firmware that does not satisfy the precondition, the important firmware having a high priority level can be updated at an early stage.

Note that even if there is a blank item among the items of the update procedure information, the firmware update control unit 12 can set a default value for a particular item. For example, when the default value of the item of processing is "install" and the item of processing is blank, the firmware update control unit 12 sets "install" in the blank item of "processing". Furthermore, when the item of priority level is blank, a default value "2" is set.

There is no default value for the other items (component number, module ID, version, precondition, release date, and download URL), and, therefore, it is determined that installation cannot be performed when these items are blank. That is, the firmware update control unit 12 interrupts the installation and displays an error message, etc. Therefore, it is possible to reduce the trouble of operations by making it possible to omit items that may be general contents in case of an emergency.

<Operation Procedure>

Figure 8:
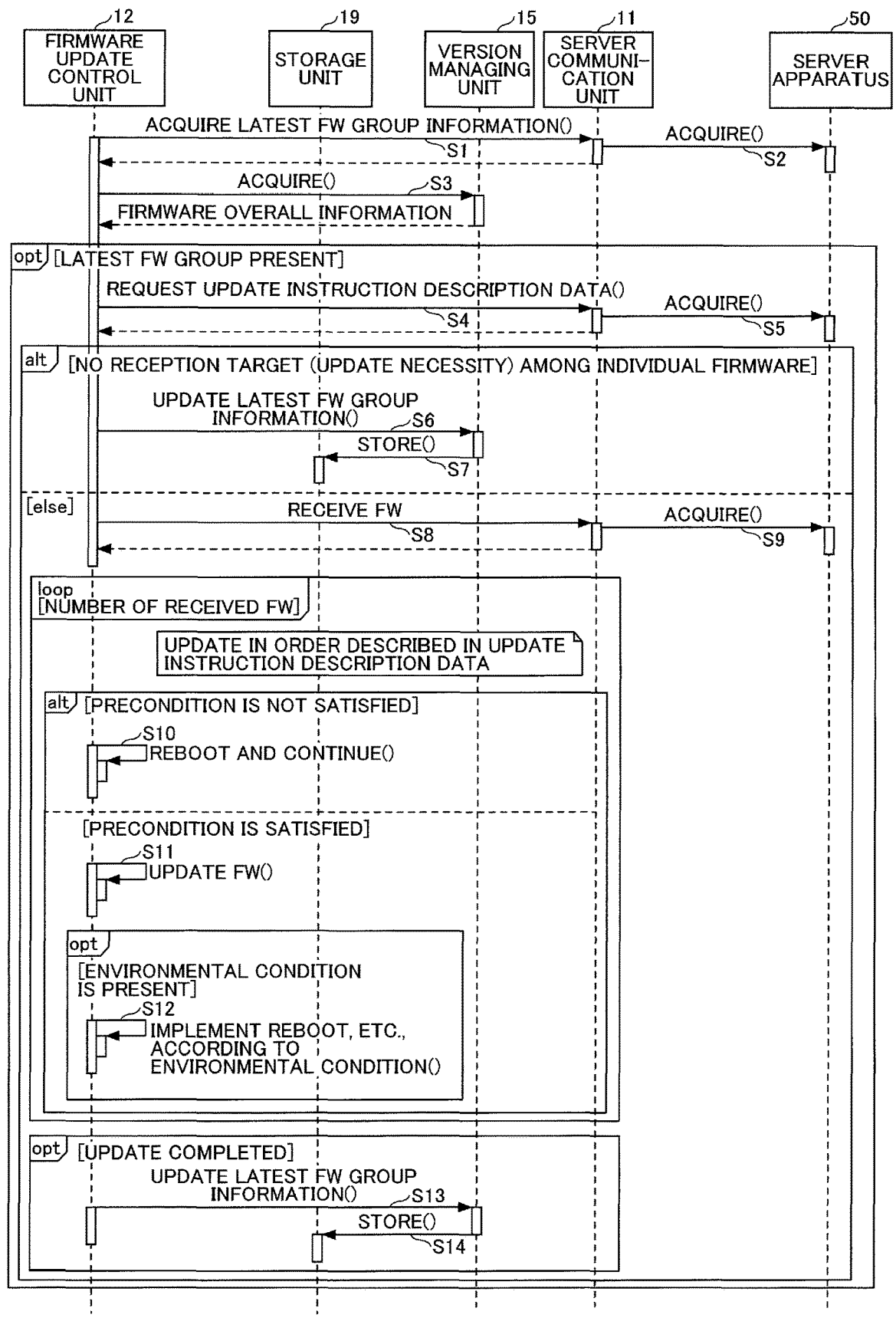
FIG. 8 is an example of a sequence diagram illustrating a procedure in which the image forming apparatus updates the firmware according to an embodiment of the present invention.

FIG. 8 is an example of a sequence diagram illustrating a procedure in which the image forming apparatus 10 updates the firmware. The process in FIG. 8 starts at a fixed time once a day, at the time of shifting to energy saving, at the time of returning from energy saving, or according to an operation by an administrator.

Step S1: The firmware update control unit 12 causes the server communication unit 11 to acquire information on the latest firmware.

Step S2: The server communication unit 11 acquires information on the latest firmware from the server apparatus 50. By transmitting the model information of the own apparatus, it is possible for the image forming apparatus 10 to acquire information on the latest firmware for the own apparatus.

Step S3: Next, the firmware update control unit 12 acquires, from the version managing unit 15, the version management list 21 including the version of the firmware that is running on the own apparatus.

Then, the firmware update control unit 12 determines whether the system version (representative version) acquired from the server apparatus 50 is newer than the representative version in the version management list 21. In the description with reference to FIG. 8, a case where the system version (representative version) is newer than the representative version in the version management list 21, will be described.

Step S4: The firmware update control unit 12 determines that there is a possibility that it is necessary to update one or more pieces of firmware from the determination result of step S3, and causes the server communication unit 11 to acquire the update instruction description data.

Step S5: The server communication unit 11 specifies the model information of the own apparatus and acquires the latest update instruction description data from the server apparatus 50.

The firmware update control unit 12 compares the acquired update instruction description data with the information of each firmware that is presently running recorded in the version management list 21, and determines whether there is firmware (module) to be updated. That is, versions are compared for each firmware.

Step S6: When updating of each individual firmware is unnecessary, the firmware update control unit 12 updates only the firmware overall information. That is, the system component number, the system ID, the system version, the I/F version, and the release date are updated. As a case of updating the firmware overall information without requiring updating of each individual firmware, there is a situation in which the administrator has individually upgraded the firmware with a Secure Digital (SD) card, etc., after factory shipment, and, therefore, the version of each individual firmware is a latest version, while the overall system has not been updated. In this case, the firmware overall information remains to be in the same state as at the time of factory shipment, and, therefore, it is preferable to update the firmware overall information. Actually, this is a case in which each individual firmware is the latest version and can thus support the latest function; however, the firmware overall information being held has not caught up with the version of each individual firmware, and, therefore, only the firmware overall information needs to be updated. By doing so, even if the firmware in the image forming apparatus is new and there is no firmware to be updated, the I/F version, etc., can be updated.

Step S7: The version managing unit 15 stores the firmware overall information acquired from the firmware update control unit 12, in the version management list 21 of the storage unit 19.

Step S8: When there is individual firmware to be updated, the firmware update control unit 12 specifies this firmware and causes the server communication unit 11 to acquire the firmware.

Step S9: The server communication unit 11 acquires the individual firmware from the server apparatus 50.

When the firmware is acquired, the process proceeds to the updating phase. In the updating phase, the firmware update control unit 12 confirms the precondition for each firmware.

The processes from and beyond step S10 are repeated as many times as the number of pieces of firmware to be updated.

Step S10: When the precondition is not satisfied, the firmware update control unit 12 reboots the image forming apparatus 10. After the image forming apparatus 10 is rebooted, the firmware update control unit 12 confirms the precondition again. Basically, the precondition is released so as to be satisfied by firmware updated earlier, and, therefore, it becomes possible to satisfy the precondition and update the firmware by rebooting the image forming apparatus 10. Note that as the number of times of rebooting increases, the overall updating time increases, and, therefore, with respect to firmware with a low priority level, for example, the updating may be skipped and the process may proceed to updating the next firmware. It may be determined according to the priority level as to whether to immediately continue the updating process or to resume the updating at the next updating timing, after the rebooting.

Step S11: When the precondition is satisfied, the firmware update control unit 12 updates the firmware.

When the updating is completed and there is an environmental condition, a process for satisfying the environmental condition is performed. This is because there are cases where a failure occurs unless the image forming apparatus 10 is rebooted with the updated firmware, and it is preferable to reboot the image forming apparatus 10 once in order to normally update the next firmware. As a case where a failure occurs, there is a case where a problem occurs in the combination with external component data (at least one of firmware overall information and firmware) due to the updated data (at least one of firmware overall information and firmware).

Step S12: According to the environmental condition, the firmware update control unit 12 can specify rebooting the image forming apparatus 10, rebooting the component units (engine, operation unit, and application, etc.), booting a component for using a new component, and performing special booting for updating special firmware, etc. These rebooting targets are also described in the environmental conditions. Note that details of rebooting will be described with reference to FIG. 9.

Step S13: Upon completion of the updating, the firmware update control unit 12 requests the version managing unit 15 to update the firmware overall information.

Step S14: The version managing unit 15 stores the firmware overall information acquired from the firmware update control unit 12 in the version management list 21 of the storage unit 19. By storing not only the firmware, but also information such as the release data of the firmware, this information can be used for determining whether the firmware is new or old at the time of updating the firmware thereafter.

Figure 9:
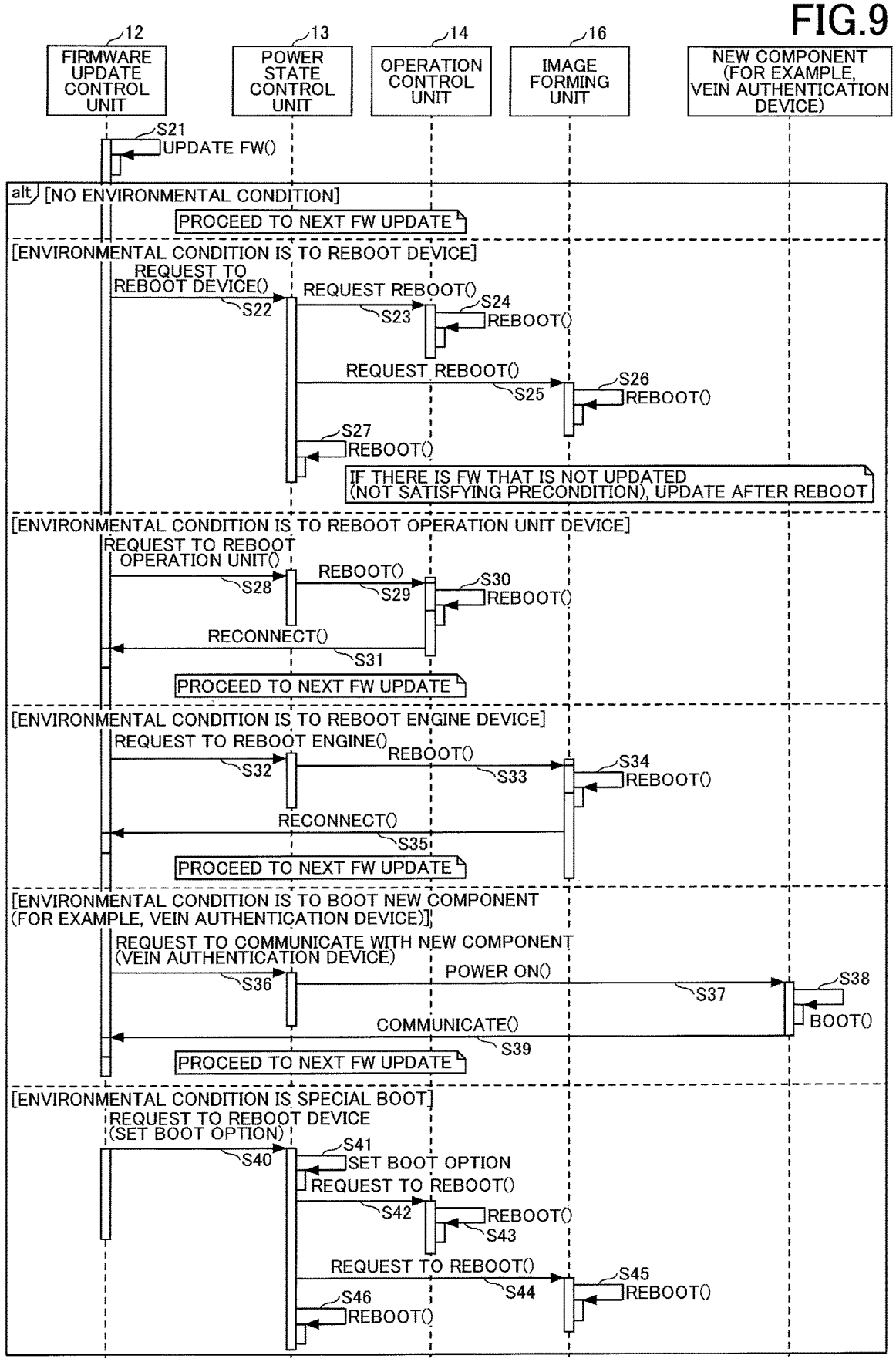
FIG. 9 is an example of a sequence diagram for describing procedures such as rebooting for satisfying an environmental condition according to an embodiment of the present invention.

FIG. 9 is an example of a sequence diagram for describing procedures such as rebooting for satisfying the environmental condition. The firmware update control unit 12 basically operates according to the environmental condition. The targets of rebooting are, for example, as described in FIG. 9, "reboot overall apparatus," "reboot operation unit," "reboot engine," "reboot new component", and "special boot", etc.

Rebooting is necessary because the execution program is loaded in the RAM 103 and operates, so even if the firmware is written in the nonvolatile memory, the presently operating program is not changed. By rebooting, the firmware is loaded in the RAM 103 and executed. Therefore, when it is defined in the precondition that the firmware to be updated this time is installed, it is necessary to reboot with this firmware. Therefore, by rebooting the image forming apparatus 10 or the component as defined in the environmental condition, another firmware can be continuously updated.

Step S21: As described above, the firmware update control unit 12 updates the firmware. Thereafter, when there is no environmental condition, the process is to proceed to the updating of the next firmware.

Step S22: When the environmental condition is to reboot the image forming apparatus 10, the firmware update control unit 12 requests the power state control unit 13 to reboot the image forming apparatus.

Step S23: The power state control unit 13 requests rebooting to the operation control unit 14.

Step S24: The operation control unit 14 reboots the operation unit 106.

Step S25: The power state control unit 13 requests rebooting to the image forming unit 16.

Step S26: The image forming unit 16 reboots the engine unit 105.

Step S27: The power state control unit 13 reboots the image forming apparatus 10.

By rebooting the entire image forming apparatus 10 with the updated firmware as described above, it becomes possible to update other firmware (it is possible to satisfy the precondition of other firmware that does not satisfy the precondition), and to cause the updated firmware to be executed normally. Furthermore, rebooting includes a case where the entire image forming apparatus 10 is rebooted and a case where at least a part of the image forming apparatus 10 is rebooted.

When there is firmware that does not satisfy the precondition before rebooting, it is confirmed that the firmware satisfies the precondition after the rebooting, and the firmware is updated.

Step S28: When the environmental condition is to reboot the operation unit 106, the firmware update control unit 12 requests the power state control unit 13 to reboot the operation unit 106.

Step S29: The power state control unit 13 requests rebooting to the operation control unit 14. Step S30: The operation control unit 14 reboots the operation unit 106.

Step S31: The operation unit 106 reports to the firmware update control unit 12 that the rebooting is completed. The environmental condition is satisfied by this rebooting, and, therefore, the process proceeds to the updating of the next firmware.

Step S32: When the environmental condition is to reboot the engine unit 105, the firmware update control unit 12 requests the power state control unit 13 to reboot the engine unit 105.

Step S33: The power state control unit 13 requests rebooting to the image forming unit 16.

Step S34: The image forming unit 16 reboots the engine unit 105.

Step S35: The image forming unit 16 reports to the firmware update control unit 12 that the rebooting is completed. The environmental condition is satisfied by this rebooting, and, therefore, the process proceeds to updating of the next firmware.

Step S36: When the environmental condition is to reboot a new component (for example, a vein authentication device), the firmware update control unit 12 requests the power state control unit 13 to communicate with the new component. The new component can be attached to and detached from the image forming apparatus 10, and the firmware of the new component (for example, a vein authentication device) is updated in a state where the new component is already connected with a USB cable, etc.

Step S37: The power state control unit 13 turns on the power of the new component.

Step S38: The new component is rebooted accordingly. The firmware does not support the new component before the firmware is updated, and, therefore, even when the power of the new component is turned on at the time of booting the image forming apparatus 10, the power turns off or becomes idle after a certain period of time. In the present embodiment, by updating the firmware, the new component becomes newly supported, and, therefore, the power is turned on.

Step S39: The new component communicates with the firmware update control unit 12 as the power is turned on. The firmware supports the new component, and, therefore, the firmware also returns a response to the new component. The power of the new component will not be turned off or become idle.

In this way, for example, there is a case that it is necessary to reconnect the image forming apparatus 10 with a component after updating the firmware. In such a case, by instructing reconnection with the component under an environmental condition, the component and the image forming apparatus 10 can normally operate. By updating the firmware, the image forming apparatus 10 can recognize a new component (a component that has not been used previously). Furthermore, by rebooting, the new components can be used. Furthermore, the rebooting can be done within a shorter time than rebooting the entire image forming apparatus 10.

Step S40: When the environmental condition is special booting, the firmware update control unit 12 sets a booting option and requests the power state control unit 13 to reboot the device.

Step S41: The power state control unit 13 sets a booting option.

Step S42: The power state control unit 13 requests rebooting to the operation control unit 14.

Step S43: The operation control unit 14 reboots the operation unit 106.

Step S44: The power state control unit 13 requests rebooting to the image forming unit 16.

Step S45: The image forming unit 16 reboots the engine unit 105.

Step S46: The power state control unit 13 reboots the image forming apparatus 10 according to the booting option. Accordingly, the image forming apparatus 10 boots in the special mode, and, therefore, firmware that has not been updated, is updated. For example, when updating firmware that cannot be rewritten in a regular state such as a key microcomputer (a microcomputer that processes data input to the touch panel), the image forming apparatus 10 is booted by a special updating program (in a special mode), and the firmware such as a key microcomputer can be updated. When the firmware update control unit 12 is booted in the special mode and the firmware is updated, the image forming apparatus 10 is rebooted in a regular mode.

<Acquisition of Information on Firmware of Past Version>

Figure 10:
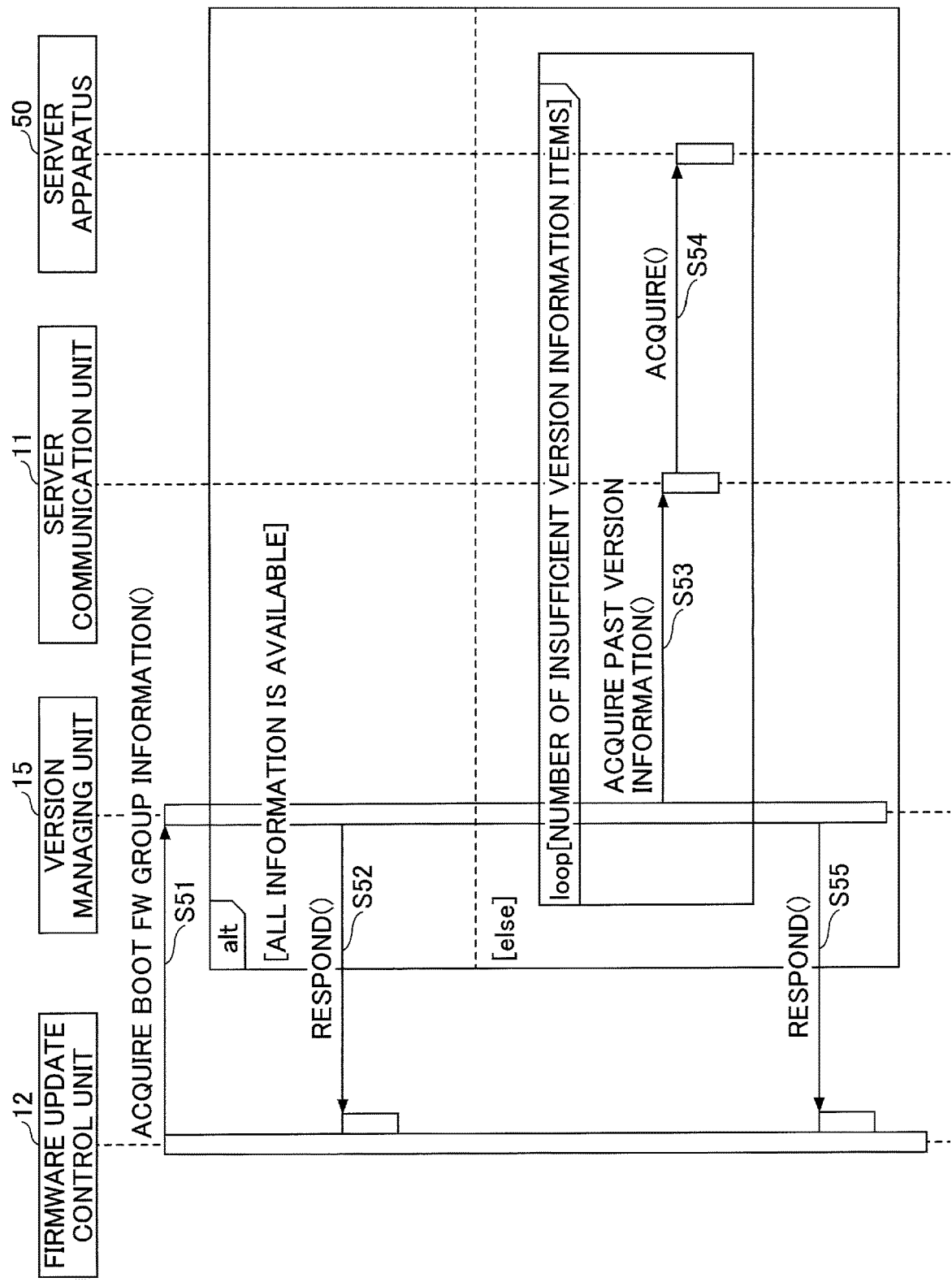
FIG. 10 is an example of a sequence diagram illustrating a procedure in which the image forming apparatus acquires information on firmware of a past version according to an embodiment of the present invention.

FIG. 10 is an example of a sequence diagram illustrating a procedure in which the image forming apparatus 10 acquires information on firmware of a past version.

As described with reference to FIG. 8, in some cases, the firmware version (version management list 21) in the image forming apparatus 10 is referred to in order to determine the precondition. Furthermore, the version of the firmware is used for determining whether the firmware of the server apparatus 50 and the image forming apparatus 10 is new or old. When information for determining whether the firmware is new or old is insufficient, such as when the version and the release date of each firmware in the image forming apparatus 10 are unknown, the image forming apparatus 10 searches for necessary information from the past information in the server.

Step S51: The firmware update control unit 12 acquires, from the version managing unit 15, the version management list 21 of Table 1 including the version of the firmware running in the own device.

Step S52: When all of the information is available, the version managing unit 15 sends the version management list 21 to the firmware update control unit 12.

Step S53: When all of the information is not available, the version managing unit 15 queries the server communication unit 11 about the information on the firmware of a past version.

Step S54: The server communication unit 11 specifies the identification information and the version of the firmware, and acquires information on the firmware of a past version from the server apparatus 50. Note that steps S53 and S54 are executed repeatedly as many times as the number of pieces of firmware for which information is insufficient.

Step S55: The version managing unit 15 sends the version management list 21, in which the insufficient items have been filled, to the firmware update control unit 12.

Accordingly, even if the information for determining whether the firmware is new or old is insufficient, such as when the release date of each firmware in the image forming apparatus 10 is unknown, etc., the image forming apparatus 10 can determine whether the firmware is new or old.

<Another Example of Environmental Condition>

The following environmental conditions have been described above.

1. Eliminating occurrence of failure due to combination with other firmware.
2. Enable updating of firmware that can only be updated in special booting mode.

Furthermore, there is an environmental condition of "3. Firmware that can be updated only in a special firmware environment or a limited firmware configuration". For example, when the firmware does not hold a mechanism for being updated in the first place, such as firmware that was not supposed to be subject to updating at the time of mass production, the firmware update control unit 12 firstly installs special firmware, which enables updating of the target firmware, in the image forming apparatus 10. Then, after the special firmware is booted, the target firmware is updated. That is, the target firmware cannot be immediately updated, and, therefore, first, firmware including a function that can be updated is updated first, and then the firmware update control unit 12 reboots the image forming apparatus 10.

As a specific example, the controller (program) of the device itself is not usually updated, such as a "NOT-AND (NAND) flash memory controller", so an updating mechanism per se is not held. When this is to be rewritten in the market, first, the firmware update control unit 12 first installs firmware having a mechanism for updating, in the image forming apparatus 10, and then the "NAND flash memory controller" is updated.

With respect to firmware that can only be updated in the special booting mode, the firmware itself is directly updated, whereas updating of the firmware of the environmental condition 3 is either special or limited.

<Summary>

By performing processes according to the environmental condition, the image forming apparatus 10 according to the present embodiment can prepare an environment in which the updated firmware can normally operate. For example, the FW updated by rebooting is loaded in the RAM, and the precondition of the next firmware to be updated can be satisfied. That is, another firmware can be updated by rebooting. Furthermore, it will be possible to update firmware that can be updated only in a special booting mode.

<Other Application Examples>

Although the best modes for carrying out the present invention have been described above by way of examples, the present invention is not limited to these examples at all, and various modifications may be made and substitutions may be added without departing from the spirit of the present invention.

For example, a new component is not limited to a vein authentication device, and various components connected by a USB cable, etc., are included. For example, firmware of a fingerprint authentication device, a face authentication device, and an operation panel, etc., may be updated.

Furthermore, in the present embodiment, updating of the firmware of the image forming apparatus 10 has been described. However, the firmware updating method according to the present embodiment can be applied to any apparatus or device having firmware. For example, the firmware updating method according to the present embodiment can be applied to a Personal Computer (PC), a projector, an electronic blackboard, a Television (TV) conference terminal, a drone, etc. Furthermore, the firmware updating method according to the present embodiment can be applied to a car navigation device, a game machine, and home appliances such as a television receiver.

Furthermore, the configuration example of FIG. 5, etc., indicated in the above embodiment is divided according to the main functions to facilitate the understanding of processes by the image forming apparatus 10 and the server apparatus 50. The present invention is not limited by how the process units are divided or the names of the process units. The processes of the image forming apparatus 10 and the server apparatus 50 may be further divided into many process units according to the process contents. Furthermore, the process units may be divided such that a single process unit further includes many processes.

Note that the firmware update control unit 12 is an example indicating the referring, determining, and executing processes executed by the hardware processor, and the server communication unit 11 is an example indicating the communicating process executed by the hardware processor.

According to one embodiment of the present invention, it is possible to provide an information processing apparatus capable of preparing an environment in which new firmware can operate normally.

The information processing apparatus and the firmware updating method are not limited to the specific embodiments described in the detailed description, and variations and modifications may be made without departing from the spirit and scope of the present invention.

What is claimed is:

1. An information processing apparatus for executing one or more pieces of firmware, the information processing apparatus comprising:
   a hardware processor configured to
      refer to update procedure information in which a precondition and an environmental condition are set, the precondition being required for updating the firmware and being set for each piece of the firmware in an updating order of updating the respective pieces of firmware, the environmental condition defining a process for preparing an environment for an updated piece of the firmware, said update procedure information including priority level of the firmware to be updated;

determine whether the precondition is satisfied in the updating order, and update the firmware that is an update target, upon determining that the precondition is satisfied; and execute the process according to the environmental condition, after updating the one or more pieces of the firmware, wherein the hardware processor tries to update the firmware again after rebooting the information processing apparatus, upon determining that the precondition is not satisfied and the priority level is higher than or equal to a threshold, and the hardware processor does not try to update the firmware again after rebooting the information processing apparatus, upon determining that the priority level is not higher than or equal to the threshold.

2. The information processing apparatus according to claim 1, wherein the environmental condition includes rebooting at least a part of the information processing apparatus after updating the firmware, and the updated firmware is loaded in a random access memory (RAM) as a result of the at least a part of the information processing apparatus being rebooted, and the precondition of another piece of the firmware is satisfied as a result of the updated firmware being loaded in the RAM.

3. The information processing apparatus according to claim 1, wherein the hardware processor reboots the entire information processing apparatus, as the process that satisfies the environmental condition.

4. The information processing apparatus according to claim 1, wherein the hardware processor reboots a component included in the information processing apparatus, as the process that satisfies the environmental condition.

5. The information processing apparatus according to claim 1, wherein a component, which is detachable from the information processing apparatus, is connected to the information processing apparatus, and the hardware processor turns on power of the component and resumes communication with the component, as the process that satisfies the environmental condition.

6. The information processing apparatus according to claim 1, wherein the hardware processor reboots the information processing apparatus in a booting mode by which the firmware of a predetermined component can be updated, as the process that satisfies the environmental condition.

7. The information processing apparatus according to claim 1, wherein the hardware processor tries to update the firmware after rebooting the information processing apparatus, for a number of retry times defined according to the priority level, upon determining that the precondition is not satisfied.

8. The information processing apparatus according to claim 1, wherein the hardware processor:

reboots the information processing apparatus after installing first firmware, among the one or more pieces of the firmware, used for updating second firmware, among the one or more pieces of the firmware, installed in the information processing apparatus; and updates the second firmware installed in the information processing apparatus by using the first firmware.

9. The information processing apparatus according to claim 1, wherein the hardware processor further communicates, via a network, with a server apparatus configured to store information relating to the firmware, wherein the hardware processor acquires, from the server apparatus, new-old determination information for determining whether the first firmware to be updated is newer than the second firmware installed in the information processing apparatus, upon determining that the new-old determination information is not included in the information processing apparatus.

10. A firmware updating method performed by an information processing apparatus for executing one or more pieces of firmware, the firmware updating method comprising:

referring to update procedure information in which a precondition and an environmental condition are set, the precondition being required for updating the firmware and being set for each piece of the firmware in an updating order of updating the respective pieces of firmware, the environmental condition defining a process for preparing an environment for an updated piece of the firmware, said update procedure information including priority level of the firmware to be updated;

determining whether the precondition is satisfied in the updating order, and updating the firmware that is an update target, upon determining that the precondition is satisfied; and executing the process according to the environmental condition, after updating the one or more pieces of the firmware, wherein the firmware updating method further comprises:

trying to update the firmware again after rebooting the information processing apparatus, upon determining that the precondition is not satisfied and the priority level is higher than or equal to a threshold, and not trying to update the firmware again after rebooting the information processing apparatus, upon determining that the priority level is not higher than or equal to the threshold.

11. A non-transitory computer-readable recording medium storing a program that causes a computer to execute a process performed in an information processing apparatus for executing one or more pieces of firmware, the process comprising:

referring to update procedure information in which a precondition and an environmental condition are set, the precondition being required for updating the firmware and being set for each piece of the firmware in an updating order of updating the respective pieces of firmware, the environmental condition defining a process for preparing an environment for an updated piece of the firmware, said update procedure information including priority level of the firmware to be updated;

determining whether the precondition is satisfied in the updating order, and updating the firmware that is an update target, upon determining that the precondition is satisfied; and executing the process according to the environmental condition, after updating the one or more pieces of the firmware, wherein the process further comprises:

trying to update the firmware again after rebooting the information processing apparatus, upon determining that the precondition is not satisfied and the priority level is higher than or equal to a threshold, and not trying to update the firmware again after rebooting the information processing apparatus, upon determining that the priority level is not higher than or equal to the threshold.

\* \* \* \* \*